(12) United States Patent
Zhang

(10) Patent No.: US 7,875,185 B2
(45) Date of Patent: Jan. 25, 2011

(54) REMOVAL OF RESIDUAL SULFUR COMPOUNDS FROM A CAUSTIC STREAM

(75) Inventor: Tiejun Zhang, Bellaire, TX (US)

(73) Assignee: Merichem Company, Houston, TX (US)

( * ) Notice: Subject to any disclaimer, the term of this patent is extended or adjusted under 35 U.S.C. 154(b) by 692 days.

(21) Appl. No.: 11/900,105

(22) Filed: Sep. 10, 2007

(65) Prior Publication Data

US 2009/0065434 A1    Mar. 12, 2009

(51) Int. Cl.
*C10G 19/08* (2006.01)
(52) U.S. Cl. .................. 210/668; 210/671; 210/694; 210/763; 208/235
(58) Field of Classification Search .............. 210/665, 210/668, 763, 671, 693, 694; 208/235
See application file for complete search history.

(56) References Cited

U.S. PATENT DOCUMENTS

| | | | |
|---|---|---|---|
| 2,740,749 A | | 4/1956 | Meguerian et al. |
| 2,853,432 A | | 9/1958 | Gleim et al. |
| 3,108,081 A | * | 10/1963 | Gleim et al. ............. 502/163 |
| 3,758,404 A | | 9/1973 | Clonts |
| 3,977,829 A | | 8/1976 | Clonts |
| 3,992,156 A | | 11/1976 | Clonts |
| 4,558,022 A | * | 12/1985 | Farmerie ............... 502/25 |
| 5,681,447 A | | 10/1997 | Maycock et al. |
| 5,935,422 A | | 8/1999 | Zinnen |
| 5,961,819 A | | 10/1999 | Lee et al. |
| 7,029,574 B2 | | 4/2006 | Yang et al. |
| 7,053,256 B2 | | 5/2006 | Yang et al. |
| 7,063,732 B2 | | 6/2006 | Katikaneni et al. |
| 7,093,433 B2 | | 8/2006 | Belluschi |
| 7,094,333 B2 | | 8/2006 | Yang et al. |
| 7,144,499 B2 | | 12/2006 | Han et al. |
| 7,148,389 B2 | | 12/2006 | Yang et al. |
| 2007/0034552 A1 | | 2/2007 | Turbeville et al. |
| 2007/0102323 A1 | | 5/2007 | Lee et al. |

FOREIGN PATENT DOCUMENTS

EP         0203574 A3      12/1986

(Continued)

OTHER PUBLICATIONS

Gabriele Hager, Elexandre G. Brolo, Adsorption/desorption behavior of cycteine and cystine in neutral and basic media: electrochemical evidence for differing thiol and disulfide adsorption to a Au(111) single crystal electrode. Journal of Electroanalytical Chemistry; 550-551 (2003) 291-301.

(Continued)

*Primary Examiner*—Matthew O Savage
(74) *Attorney, Agent, or Firm*—McDonnell Boehnen Hulbert & Berghoff LLP

(57) ABSTRACT

A process for the removal of residual sulfur compounds from a liquid caustic stream is disclosed. One embodiment of my invention adsorbs disulfides from a caustic stream using an activated carbon adsorbent while another combines both oxidation and adsorption in single step to remove residual sulfur compounds from a rich caustic stream using metal phthalocyanine supported on a solid adsorbent. This process is especially useful as a polishing step in a caustic regeneration process flow scheme.

11 Claims, 2 Drawing Sheets

FOREIGN PATENT DOCUMENTS

GB 782942 9/1957

OTHER PUBLICATIONS

Wang et al. Desulfurization of High-Sulfur Jet Fuel by π-Complexation with Copper and Palladium Halide Sorbents.

International Search Report of the ISA/EP in related PCT application No. PCT/US2008/006404, dated Aug. 18, 2008, 5 pages.

Written Opinion of the ISA/EP in related PCT application No. PCT/US2008/006404, dated Aug. 18, 2008, 6 pages.

* cited by examiner

REMOVAL OF RESIDUAL SULFUR COMPOUNDS FROM A CAUSTIC STREAM

FIELD OF THE INVENTION

My invention relates generally to a process for the removal of residual sulfur compounds from a liquid caustic stream. More specifically, one embodiment of my invention adsorbs disulfides from a caustic stream using an activated carbon adsorbent. In another embodiment, my invention combines both adsorption and catalytic oxidation to remove residual sulfur compounds from a caustic stream using metal phthalocyanine supported on a solid adsorbent. My invention can also be integrated into a process for removing sulfur contaminants from hydrocarbons using caustic regeneration as a polishing process, thus minimizing the need for expensive solvent washing processes.

BACKGROUND OF THE INVENTION

The removal of sulfur contaminants, specifically mercaptans, from hydrocarbon streams using caustic is well known. Likewise, the oxidation of these mercaptans to disulfides by contacting the rich caustic stream with a solid catalyst in the presence of oxygen followed by separation of the disulfides from the treated caustic is also well known. Regardless of the oxidation and/or separation processes employed, there will always be residual sulfur compounds remaining in the treated caustic solution. With pressing needs for more economical processes that also are more compact, there is a need to replace traditional solvent washing with a smaller more efficient polishing process to yield sulfur free caustic that can be reused to treat sulfur contaminated hydrocarbons.

The enactment of the US Clean Air Act of 1990 has reached its zenith in North America with the gasoline pool being required to contain less than 10-wppm of sulfur. This means from a practical standpoint that the refinery normally makes a gasoline pool containing less than 5-wppm to allow for pipeline contamination of residue wall "clingage" sulfur from previous shipments and the accuracy of the testing method dictated by the Clean Air Act.

Another consequence of the Clean Air Act of 1990 has been the shutting down of the small inefficient refiners in America going from 330 plus refiners in 1980 to less than 175 refiners in 2007. No new refiners have been built in the past 25 years, but refiner expansions and imports have satisfied the gasoline demand in America.

The existing refiners have also gone to higher severity Fluid Catalytic Cracking Unit operations to reduce the amount of burner fuel while producing additional higher octane gasoline and increased olefin production. These olefins are propane/propylene and butane/isobutane/isobutylene. These are the feedstocks for the next processing step which is an alkylation unit. Some refiners alkylate amylenes (pentene) depending on their economic models.

Most refineries use either an HF (hydrofluoric acid) or a sulfuric acid alkylation unit to alkylate mixed butylenes or mixed propylene's and butylenes. Alkylation is a process where isobutane reacts with the olefin to make a branched chain paraffin. Since sulfur is detrimental to the alkylation process, a caustic treating system is in place at most refineries to extract the easily extracted methyl and ethyl mercaptans and the more difficult propyl mercaptans present in the mixed olefinic liquid petroleum gas ("LPG") stream.

Typically, liquid-liquid contactors are employed for the caustic treatment and in some cases fiber-film contactors as described in U.S. Pat. Nos. 3,758,404; 3,977,829 and 3,992,156, all of which are incorporated herein by reference. To conserve caustic, a caustic regenerator is almost always employed. A typical process flow scheme for treating LPG involves a first caustic treatment using at least one liquid-liquid contactor to extract the sulfur contaminants, typically mercaptans, from the LPG feed, which generates a "spent" caustic solution that is rich in mercaptan or so called rich caustic, separating the LPG in the contactor, oxidizing the rich caustic to convert mercaptans to disulfides (typically referred to as disulfide oil ("DSO")) which generates an "oxidized" caustic solution, and then using a gravity separator to separate the DSO from the oxidized caustic solution. In some instances a granular coal bed is used in conjunction with the gravity settling device as a coalescer to further assist in the separation of the DSO from the oxidized caustic. Once the DSO is removed, the regenerated caustic can be further processed and then recycled, where it is mixed with fresh make-up caustic and used in the liquid-liquid contactors to treat the LPG feed. More typically, a further polishing processing is required in order to reduce the unconverted mercaptans and residual DSO to preferably below 5 weight ppm as sulfur. The presence of substantial mercaptans in regenerated caustic is undesirable because it can cause a loss of extraction efficiency and presents a potential for downstream formation of disulfides. The presence of substantial DSO in regenerated caustic leads to undesirable re-entry or back extraction of DSO into hydrocarbon during the hydrocarbon-caustic extraction process.

Solvent washing is a known technology and is often used as a polishing step to extract residual DSO from caustic. However, due to mass transfer and equilibrium limitations, these solvent washing unit operations usually require multiple stages with higher capital and operating costs. Besides, solvent washing is ineffective to remove mercaptans from caustic. Similarly, centrifugal process and membrane separation suffer from high costs and inability to achieve less than 5 weight ppm sulfur.

Adsorptive polishing is another technology that can be used. Adsorptive desulfurization has been applied to remove sulfur compounds from hydrocarbons such as gasoline and diesel. Examples are shown in U.S. Pat. Nos. 7,093,433; 7,148,389; 7,063,732; and 5,935,422. However, the adsorbents reported in these patents and in other literature are ineffective in caustic media.

Therefore, there remains a need to develop a technology that can economically removes both disulfides and mercaptans from caustic as a polishing process to achieve less than 20 weight ppm sulfur, preferably less than 5 ppm and most preferably less than 2 ppm.

My process uses single step oxidation and adsorption separation (OAS) to remove both disulfides and mercaptans from caustic solution. The OAS process replaces solvent washing as a polishing step and, when used after bulk DSO separation, converts residual mercaptans to DSO and removes all residual DSO including the DSO that was formed in-situ from mercaptans. Further, my process is extremely economical compared to traditional methods for removing residual sulfur compounds from caustic solutions by minimizing both capital and operating costs. These and other advantages will become evident from the following more detailed description of the invention.

SUMMARY OF THE INVENTION

As mentioned, my invention relates to processes for removing residual sulfur compounds remaining in an oxidized caustic solution formed during caustic regeneration. In one aspect, my invention can adsorb residual DSO on an activated carbon adsorbent such that the recovered caustic stream contains less than 20 ppm by weight, preferably less than 5 ppm by weight (as sulfur) of sulfur compounds.

Although it is well known to use oxidation as a means to convert mercaptans to DSO, such known processes typically do not convert all the mercaptans to DSO, thus leaving up to 5% or more of the mercaptans in the oxidation reaction product stream. Prior to this invention, the unconverted mercaptans are always left unconverted in the regenerated caustic, which adversely impacts the subsequent caustic-hydrocarbon extraction process. What has not been realized before my invention is that those residual mercaptans can be converted to DSO and adsorbed, along with the residual DSO not removed in the separation process that normally follows oxidation of rich caustic streams, all in single step. My process can easily integrate into new and existing caustic regeneration process flow schemes where a rich caustic stream is generated when sulfur contaminants from LPG and other hydrocarbon streams are contacted with lean caustic.

As used herein, disulfide oil or DSO is meant to include a mixture of possible disulfides, including dimethyl disulfide, diethyl disulfide, methyl ethyl disulfide and higher disulfides. Likewise, the term mercaptan is meant to include any of a class of organosulfur compounds that are similar to the alcohol and phenol, but containing a sulfur atom in place of the oxygen atom, and specifically includes mercaptides. Compounds containing —SH as the principal group directly attached to carbon are named 'thiols'.

One aspect of my invention involves a process for removing residual sulfur compounds from a caustic feed stream, comprising, in combination, introducing a caustic feed stream comprising caustic and sulfur compounds into a polishing unit, where the sulfur compounds comprise less than 500 weight ppm as sulfur, preferably less than 100 weight ppm, and most preferably less than 50 weight ppm; contacting the caustic stream with a solid bed of adsorbent; adsorbing on the adsorbent disulfides introduced into the polishing unit as part of the sulfur compounds in the caustic feed stream; and removing from the polishing unit a polished caustic stream product comprising less than 20 weight ppm, preferably less than 5 weight ppm, and most preferably less than 2 weight ppm (as sulfur) of sulfur compounds. The preferred adsorbents are activated carbons having a high DSO adsorption capacity, that have pore volumes of 0.5-1.5 cc/g BJH $N_2$ and/or surface areas of 500-2,000 $m^2/g$ BET, manufactured from raw materials such as coal, lignite, wood, peat, olive pit, and coconut shell. Examples are Norit lignite-based MRX, MeadWestvaco wood-based Nuchar series, Calgon coal-based CPG activated carbons. Activated carbons can be granular or extruded pellets. Operating temperatures of my invention range from about 50 to about 212° F., preferably from about 75 to about 175° F., and most preferably from about 75 to about 150° F. My process can operate at ambient pressure or at the operating pressures typically encountered in caustic regeneration process flow schemes.

Another aspect of my invention relates to a process for removing residual sulfur compounds from a caustic feed stream, comprising, in combination, introducing a caustic feed stream comprising caustic and sulfur compounds into a polishing unit, where the sulfur compounds comprise less than 500 weight ppm as sulfur, preferably less than 100 weight ppm, and most preferably less than 50 weight ppm; introducing an oxidant into the polishing unit; admixing and contacting the caustic stream and oxidant in the presence of a catalyst bed comprising a supported metal phthalocyanine; converting mercaptans that are present as part of the sulfur compounds to disulfides; adsorbing on the catalyst support the disulfides formed in-situ from mercaptans and disulfides introduced into the polishing unit as part of the sulfur compounds in the caustic feed stream; and removing from the polishing unit a polished caustic stream product comprising less than 20 weight ppm, preferably less than 5 weight ppm, and most preferably less than 2 weight ppm (as sulfur) of sulfur compounds.

These and other objects will become more apparent from the detailed description of the preferred embodiment contained below.

DETAILED DESCRIPTION OF PREFERRED EMBODIMENTS

As stated, my invention concerns a novel process for integration into a caustic regeneration processing scheme that is designed to remove residual sulfur compounds from an oxidized caustic stream after bulk separation of the DSO formed during oxidation. One specific application of my invention relates to a polishing process to remove residual sulfur contaminants from oxidized caustic streams that are deleterious to downstream processes, particularly in caustic treatment of hydrocarbons, such as LPG. More specifically, my invention eliminates the need for costly solvent washing to obtain lean caustic having less than 5 ppm by weight sulfur compounds and which is suitable for recycle for contacting the contaminated hydrocarbons.

Figure 1:
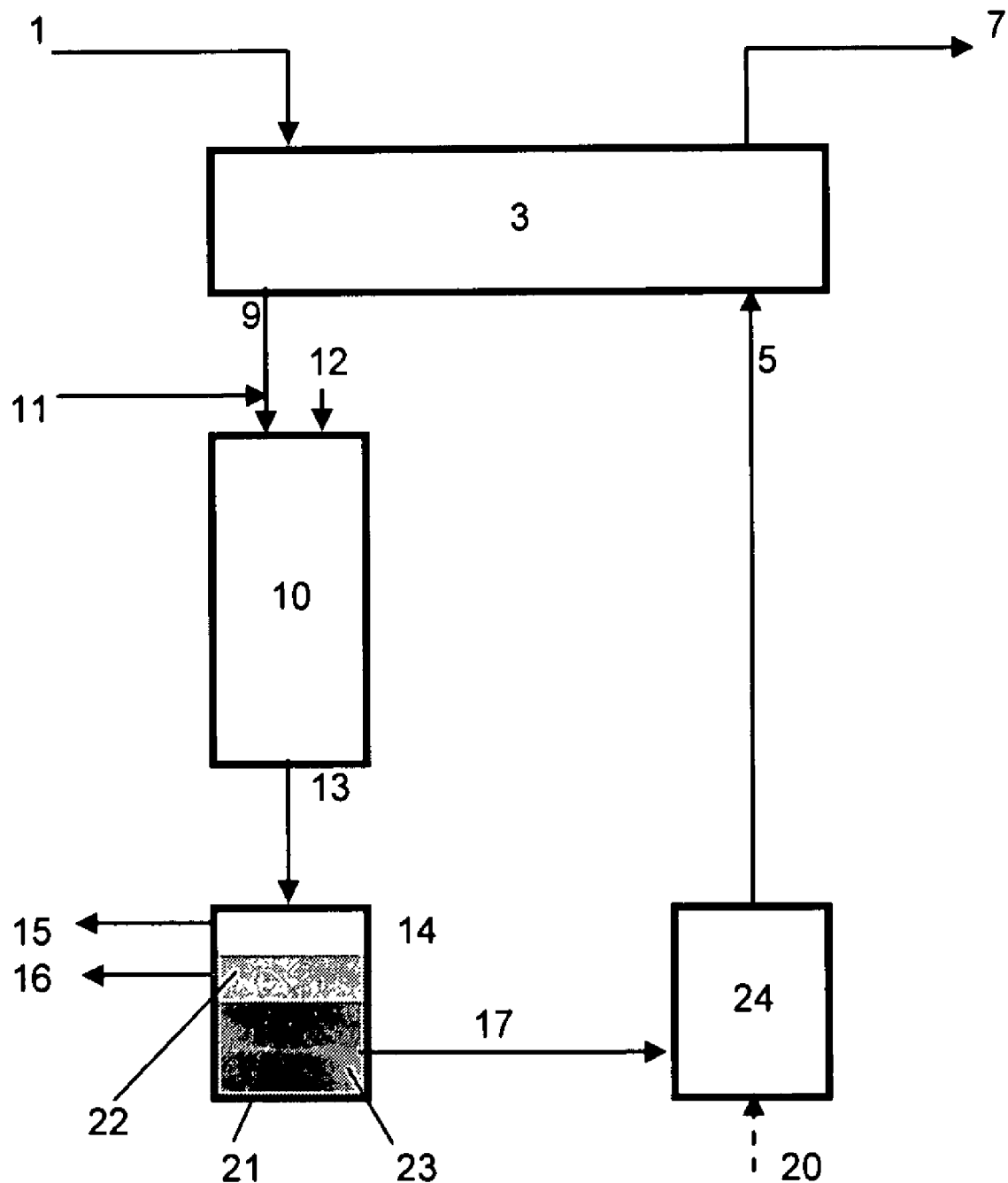
FIG. 1 schematically illustrates one possible embodiment of the process of my invention using either adsorption alone or a combination of oxidation and adsorption in single step to remove residual sulfur compounds from a caustic stream that has undergone oxidation and separation of a majority of the DSO generated in the oxidation of the rich caustic.

FIG. 1 illustrates one embodiment of my invention where LPG feed, contaminated with mercaptan compounds, for example methyl and ethyl mercaptide, is fed via line 1 to a caustic treatment section 3. The specific design of the caustic treatment section is not critical to my invention; however, a preferred design includes staged contactors operating in a counter-current configuration, with a most preferred contactor configuration using fiber film liquid-liquid contactors. These as well as other contactor configurations are well known to those skilled in the art. Lean caustic is fed via line 5 into contactor treatment section 3 where it contacts with LPG introduced via line 1. The caustic used in my invention can be any type known to the art of sweetening hydrocarbons, including solutions comprising NaOH, KOH, Ca(OH)2, Na2CO3, ammonia, extraction of organic acids, or mixtures thereof. Preferably, the caustic comprises aqueous potassium hydroxide solutions and aqueous sodium hydroxide solutions having concentration of from about 1% to about 50%, more preferably from about 3% to about 25%, still more preferably from about 5% to about 20%, by weight alkali hydroxide.

Substantially sulfur free LPG is removed from contactor section 3 via line 7 and is used in subsequent processes, for example, in an alkylation unit. By substantially sulfur free we mean the LPG has a sulfur level of <150 ppm total sulfur, preferably <20 ppm total sulfur and more preferably <10 ppm total sulfur. The caustic solution from contactor section 3 is a rich caustic solution that is removed via line 9. Rich caustic contains the mercaptans in the form of mercaptides and other sulfur contaminants extracted from the LPG feed.

The rich caustic from the caustic treatment section is then fed to oxidizer 10. As with the liquid-liquid contactors, the exact design of the oxidizer is not critical to my invention and any number of oxidizer designs may be used, such as air bubble oxidizers, non-catalytic solid packing and solid catalyst technology. A preferred oxidizer is one that contains a solid bed of catalyst, preferably a catalyst containing an active metal, such as cobalt, impregnated on a solid support, for example, activated carbon. A most preferred catalyst is one sold commercially by Merichem Company under the brand name ARI™-120L. In one alternative embodiment of my invention a small volume solvent stream 11 is introduced to oxidizer 10 along with the rich caustic stream. This solvent stream can be mixed with the rich caustic prior to entering the oxidizer or injected as a separate stream into the oxidizer. The solvent can be any light hydrocarbon that will assist in the downstream separation of the DSO from the caustic solution after oxidation. Any relatively light hydrocarbon or mixture of such hydrocarbons can be used as a solvent in my invention, however, preferred solvents included naphtha and kerosene. Although the exact mechanism of how the solvent improves the separation of DSO from the oxidized caustic is not specifically known, one theory is that the solvent has a much higher solubility of DSO than caustic, with their differential of solubility providing an extractive driving force. This effect is further magnified by carrying out the process in a fiber film device that provides higher interfacial surface area. The amount of solvent, based on the volume percent of the rich caustic feed, injected into the oxidizer, either with the rich caustic or separately, is not especially critical to my invention as long as a minimum amount is used so as to improve the down-stream separation performance. As mentioned only a small volume of solvent is needed, with a preferred range of minimum solvent injection from about 0.1 vol % to about 10.0 vol %, preferably from about 0.5 vol. % to about 5.0 vol. %, of the rich caustic feed via line 9.

In addition to the rich caustic and solvent feeds to the oxidizer, an oxidant, such as air, hydrogen peroxide, or other oxygen containing gas(es), is introduced to the oxidizer through line 12. The amount of oxidant added to the oxidizer is sufficient to achieve 95+% oxidation of the mercaptan compounds originally present in the LPG to disulfide compounds, most preferably 99+% oxidation. A preferred range of operating conditions for the oxidizer includes a temperature of from about 75° F. to about 200° F. and a caustic flow rate of as high as 10 LHSV, but preferably from about 100° F. to about 150° F. and less than 5 LHSV. The operating pressure of my process is not critical so long as it keeps the process streams in a liquid state.

The effluent from oxidizer 10, or the oxidized caustic, which is an admixture of caustic, DSO, and residual mercaptans (as mercaptides), is removed via line 13 from oxidizer 10 and passed to separator 14 where the bulk of DSO is separated from the caustic using any known separation technology, typically a gravity settler.

During the operation of separator 14 two layers form in the bottom of collection vessel 21; a lower layer 23 comprising caustic solution and an upper layer 22 comprising the bulk of the DSO formed during the oxidation step. As mentioned, FIG. 1 also illustrates an alternative embodiment where a small stream of solvent added upstream of oxidizer 10. When this alternative is used, the added solvent is removed along with the DSO in upper layer 22. Off gases, if any, are removed from the top of collection vessel 21 through line 15. The DSO in upper layer 22 is removed from separator vessel 14 via line 16 and sent to storage or for further processing.

The residence time within separator 14 is selected to achieve maximum removal of the DSO from the caustic phase, with the target concentration of all sulfur compounds, including mercaptans, being less than 500 ppm by weight, more specifically less than 100 ppm. Typical residence times for a gravity settler are 90 minutes or more.

The rate of removal of the caustic solution in lower layer 23 via line 17 is adjusted to maintain the correct residence time necessary to achieve sulfur contaminant levels in this layer to 500 ppm or less. The separated caustic solution in stream 17 is then directed to a polishing unit 24 where the residual DSO is adsorbed onto a solid adsorbent, preferably activated carbon. In those situations where the caustic contains mercaptans then the activated carbon contains a metal catalyst to convert the mercaptans to disulfides. These disulfides are then adsorbed onto the solid adsorbent which also functions as a catalyst support. To assist in this conversion of mercaptans, an oxidant in the form of air or at least one oxygen containing gas is also introduced into the polishing unit 24 (shown by dashed line 20). The amount of oxidant introduced into the unit should be such that it is at least one time, preferably two times, of the stoichiometric amount required for oxidation of the mercaptans to disulfides. As previously stated, the preferred solid adsorbents are activated carbons with pore volumes of 0.5-1.5 cc/g BJH $N_2$ and/or surface areas of 500-2,000 $m^2/g$ BET. The metal catalyst is preferably metal phthalocyanine, most preferably where the metal is selected from iron and cobalt, or a mixtures of these and is supported on the solid adsorbent. Optionally, my invention may include a regeneration process whereby the solid adsorbent is periodically subjected to a regeneration process. Those skilled in the art will appreciate that there numerous regeneration methods, both in-situ and off-column, to regenerate adsorbent beds, including, ion exchange, solvent back washing, calcination, pyrolysis, etc. The specific method used is dependent on the adsorbent selected, whether there is a catalyst present, and the economics and effectiveness of the overall polishing process.

My invention can produce lean caustic having less than 5 weight ppm of sulfur contaminants. The final purified caustic is then removed from vessel 24 as lean caustic and recycled via line 5 to the caustic treatment section 3.

EXAMPLE

To demonstrate the surprising and unexpected performance of my invention, laboratory testing was performed. A 1-inch diameter and 4 feet height column was packed with an activated carbon that had been pre-impregnated with cobalt phthalocyanine. Feed caustic containing average 86 weight ppm of sulfur compounds was introduced into the column, along with an air stream that provided more than five times of the stoichiometric amount required for complete oxidation of the mercaptans to disulfide. The column was maintained at about 125° F. and 25 psig.

Figure 2:
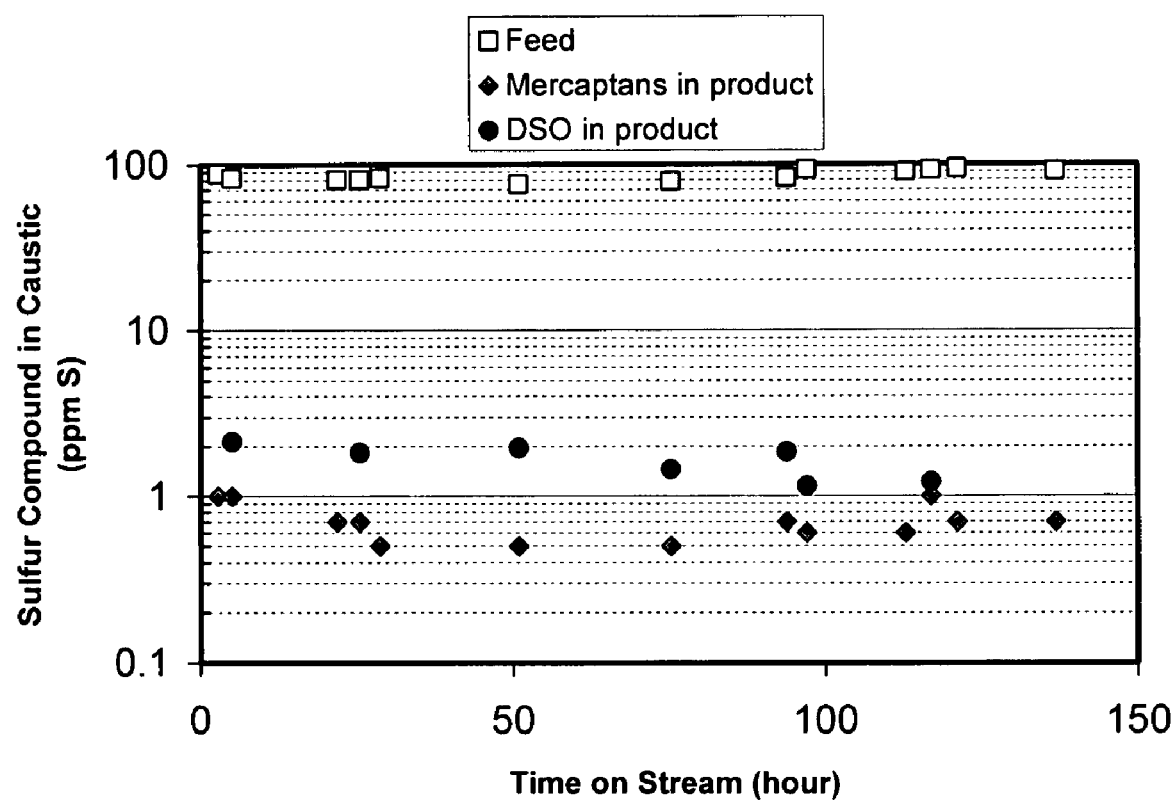
FIG. 2 is a graphical representation showing the effectiveness of my invention, where a caustic feed containing an average of 86 weight ppm sulfur compounds is polished to contain less than 1 weight ppm mercaptan and less than 2 weight ppm DSO in the caustic product.

The performance of the invention is shown in FIG. 2. As the feed caustic contained an average 86 weight ppm of sulfur compounds, the product caustic contained less than 1 weight ppm of mercaptans and less than 2 ppm of disulfides. The total sulfur compounds are substantially below 5 weight ppm.

Also surprising is the observation that this performance was consistent over at least 137 hours of continuous operation without significant breakthrough. During this period, the activated carbon bed had adsorbed sulfur compounds that were about 17 weight percent (as sulfur) of its own weight.

When the carbon bed is eventually saturated, it may be replaced with a new bed of material or regenerated for multiple cycles of uses. Economics and effectiveness of regeneration dictate the choice.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

I claim:

1. A process for removing residual sulfur compounds from a caustic feed stream, comprising, in combination,
   a) obtaining a caustic feed stream from a lower layer of a gravity separator, wherein caustic entering the gravity separator has been previously oxidized in an oxidization process, and wherein residual sulfur compounds in the caustic feed stream comprise less than 500 weight ppm measured as elemental sulfur;
   b) introducing the caustic feed stream of step a) into a polishing unit;
   c) introducing an oxidant into the polishing unit;
   d) admixing and contacting the caustic feed stream and oxidant within the polishing unit in the presence of a catalyst bed comprising a metal phthalocyanine catalyst supported on a catalyst support;
   e) converting mercaptans that are present as part of the sulfur compounds in the caustic feed stream to disulfides;
   f) adsorbing on the catalyst support the disulfides formed in step e) and disulfides introduced into the polishing unit as part of the sulfur compounds in the caustic feed stream; and
   g) removing from the polishing unit a polished caustic stream product comprising less than 20 weight ppm of sulfur compounds measured as elemental sulfur.

2. The process of claim 1 where the sulfur compounds in the caustic feed stream comprise less than 100 weight ppm measured as elemental sulfur.

3. The process of claim 1 where the sulfur compounds in the caustic feed stream comprise mercaptans and disulfides.

4. The process of claim 3 where the mercaptans comprise less than 50 weight ppm measured as elemental sulfur in the caustic feed stream.

5. The process of claim 1 where the caustic feed stream and oxidant is contacted within the polishing unit with a fixed bed of activated carbon impregnated with metal phthalocyanine.

6. The process of claim 5 where the metal is selected from the group comprising cobalt, iron and mixtures thereof.

7. The process of claim 5 where the activated carbon has a pore volume of 0.5-1.5 cc/g BJH $N_2$ and/or surface area of 500-2,000 $m^2$/g BET.

8. The process of claim 5 where the activated carbon is wood based.

9. The process of claim 1 where the oxidant is air or at least one oxygen-containing gas.

10. The process of claim 1 where at least a portion of the catalyst support adsorbent is subjected to a regeneration process.

11. The process of claim 1 where the sulfur compounds in the polished caustic stream product comprise less than 5 weight ppm measured as elemental sulfur.

* * * * *